US009982392B2

(12) United States Patent
Kern et al.

(10) Patent No.: US 9,982,392 B2
(45) Date of Patent: May 29, 2018

(54) ANTIFOAMING AGENTS FOR THE PAPER INDUSTRY, BASED ON OIL IN WATER EMULSIONS

(71) Applicant: BASF SE, Ludwigshafen (DE)

(72) Inventors: Holger Kern, Kirchardt (DE); Christoph Hamers, Ludwigshafen (DE); Klaus Moeller, Mutterstadt (DE); Uwe Albrecht, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days. days.

(21) Appl. No.: 15/035,959

(22) PCT Filed: Nov. 17, 2014

(86) PCT No.: PCT/IB2014/066095
§ 371 (c)(1),
(2) Date: May 11, 2016

(87) PCT Pub. No.: WO2015/075618
PCT Pub. Date: May 28, 2015

(65) Prior Publication Data
US 2016/0265162 A1    Sep. 15, 2016

(30) Foreign Application Priority Data

Nov. 19, 2013 (EP) ..................................... 13193418

(51) Int. Cl.
*B01D 19/04* (2006.01)
*D21H 21/12* (2006.01)
*D21H 17/04* (2006.01)
*D21H 17/06* (2006.01)
*D21H 17/14* (2006.01)
*D21C 3/28* (2006.01)
*C11D 3/00* (2006.01)

(52) U.S. Cl.
CPC ......... *D21H 21/12* (2013.01); *B01D 19/0404* (2013.01); *D21H 17/04* (2013.01); *D21H 17/06* (2013.01); *D21H 17/14* (2013.01); *C11D 3/0026* (2013.01); *D21C 3/28* (2013.01)

(58) Field of Classification Search
CPC ........ D21H 21/12; D21H 21/14; D21H 17/14; D21H 17/04; D21H 17/06; B01D 19/04; B01D 19/0404; D21C 3/28; C11D 3/0026
USPC .......... 516/73, 133; 162/75, 162, 167.7, 173, 162/179
See application file for complete search history.

(56) References Cited

U.S. PATENT DOCUMENTS

| 4,336,171 A * | 6/1982 | Kohlstadt ................ C08J 5/127 156/307.3 |
| 4,664,844 A | 5/1987 | Bergold et al. |
| 4,950,420 A | 8/1990 | Svarz |
| 4,976,888 A | 12/1990 | De Clercq et al. |
| 5,041,688 A | 8/1991 | Jakobson et al. |
| 5,326,499 A * | 7/1994 | Wegner ................... D21H 17/00 162/179 |
| 5,474,604 A * | 12/1995 | Demmering .......... C10M 105/08 106/38.24 |
| 5,679,286 A * | 10/1997 | Wollenweber ...... B01D 19/0021 516/132 |
| 5,807,502 A * | 9/1998 | Wollenweber ...... B01D 19/0404 516/18 |
| 7,183,325 B2 * | 2/2007 | Dyllick-Brenzinger ........ B01D 19/0404 516/115 |
| 7,763,664 B2 * | 7/2010 | Bonn .................. B01D 19/0404 106/504 |
| 9,650,745 B2 * | 5/2017 | Kormann ................ D21H 21/12 |
| 2004/0176480 A1 | 9/2004 | Dyllick-Brenzinger et al. |
| 2006/0111453 A1 * | 5/2006 | Bonn .................. B01D 19/0404 516/135 |
| 2006/0276554 A1 | 12/2006 | Dyllick-Brenzinger et al. |
| 2010/0212847 A1 * | 8/2010 | Hamers ............... B01D 19/0404 162/75 |
| 2013/0303635 A1 * | 11/2013 | Gaschler ............. B01D 19/0404 516/29 |
| 2014/0107229 A1 * | 4/2014 | Kormann ........... B01D 19/0404 516/73 |
| 2017/0183821 A1 * | 6/2017 | Buchan ................. D21H 17/45 |

FOREIGN PATENT DOCUMENTS

CN    1538866 A      10/2004
DE    38 42 692 A1   6/1990
(Continued)

OTHER PUBLICATIONS

Hawley's Condensed Chemical Dictionary, (2007), John Wiley & Sons, Inc. Online @ http://onlinelibrary.wiley.com/mrw/advanced/search?doi=10.1002/9780470114735 , downloaded Jan. 6, 2017), pp. 1, 131 & 680.*
Derwent Abstract on EAST, week 201427, London: Derwent Publications Ltd., AN 2012-P87954, WO 2012152810 A1 & US 20140107229 A1, (BASF SE), abstract (pp. 1-4).*
International Preliminary Report on Patentability and Written Opinion dated Jun. 2, 2016 in PCT/IB2014/066095 filed Nov. 17, 2014.
William C. Griffin, "Calculation of HLB Values of Non-Ionic Surfactants" Journal of the Society of Cosmetic Chemists, vol. 5, 1954, pp. 249-256.
International Search Report dated Apr. 3, 2015 in PCT/IB2014/066095 Filed Nov. 17, 2014.
(Continued)

*Primary Examiner* — Daniel S Metzmaier
(74) *Attorney, Agent, or Firm* — Oblon, McClelland, Maier & Neustadt, L.L.P.

(57) ABSTRACT

An antifoaming agent, based on an oil-in-water emulsion in which the oil phase accounts for from 5-50% by weight of the emulsion, where the oil phase includes: (a) at least one selected from the group consisting of (a1) an alcohol of not less than 12 carbon atoms and (a2) a $C_1$-$C_{36}$-carboxylic acid, a distillation residue; (d) a component including (d1) a polyglyceryl ester and (d2) a $C_{18}$-$C_{30}$ alkyl behenate, wherein the component (d) accounts for 1-80% by weight of the oil phase of the emulsion.

3 Claims, 2 Drawing Sheets

(56) References Cited

FOREIGN PATENT DOCUMENTS

| EP | 0 149 812 A2 | 7/1985 |
| EP | 0 322 830 A2 | 7/1989 |
| EP | 0 531 713 A1 | 3/1993 |
| JP | 60-83559 A | 5/1985 |
| JP | 61-227756 A | 10/1986 |
| WO | WO 2012/095393 A1 * | 7/2012 |
| WO | WO 2012/0152810 * | 11/2012 |

OTHER PUBLICATIONS

Extended European Search Report dated May 30, 2017 in Patent Application No. 14864951.0.
Combined Chinese Office Action and Search Report dated Nov. 30, 2016 in Patent Application No. 201480062753.3 (with English Translation and English Translation of Category of Cited Documents).

* cited by examiner

ANTIFOAMING AGENTS FOR THE PAPER INDUSTRY, BASED ON OIL IN WATER EMULSIONS

CROSS REFERENCE TO RELATED APPLICATION

This application is a 371 of PCT/IB2014/066095, filed on Nov. 17, 2014, and claims priority to European Patent Application 13 193 418.4, filed on Nov. 19, 2013.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF THE MATERIAL ON THE COMPACT DISC

Not Applicable.

BACKGROUND OF THE INVENTION

Field of the Invention

The present invention relates to antifoaming agents for paper industry, based on oil-in-water emulsions, in which the oil phase accounts for from 5 to 50% by weight of the emulsion, and contains a combination of known antifoaming agents, for example long-chain alcohols or fatty esters of alcohols of not less than 22 carbon atoms and $C_1$-$C_{36}$-carboxylic acids.

Description of the Related Art Including Information Disclosed Under 37 CFR 1.97 and 1.98

U.S. Pat. No. 4,950,420 discloses antifoaming agents for the paper industry which contain from 10 to 90% by weight of a surfactant polyether, such as polyoxyalkylated glycerol or polyalkoxylated sorbitol, and from 10 to 90% by weight of a fatty ester of a polyhydric alcohol, such as a mono- or diester of polyethylene glycol or polypropylene glycol. These antifoaming agents are free of any oils, amides or water-repellent silica or silicone oils.

EP-A-0 149 812 discloses that antifoaming agents based on oil-in-water emulsions, in which the oil phase of the emulsion contains (a) a $C_{12}$-$C_{26}$-alcohol, distillation residues which have been obtained in the preparation of alcohols having a relatively high number of carbon atoms by the oxo synthesis or by the Ziegler method and may furthermore be alkoxylated and/or (b) a fatty ester of a $C_{12}$-$C_{22}$-carboxylic acid with a monohydric to trihydric $C_1$-$C_{18}$-alcohol and, if required, (c) a hydrocarbon having a boiling point above 200° C. or a fatty acid of 12 to 22 carbon atoms, and accounts for from 15 to 60% by weight of the emulsion and has a mean particle size of from 0.5 to 15 μm, can be stabilized to an increase in viscosity and creaming during storage by adding from 0.05 to 0.5% by weight of a high molecular weight, water-soluble homo- or copolymer of acrylic acid, methacrylic acid, acrylamide or methacrylamide.

JP-A-60/083559 and JP-A-61/227756 disclose the use of polyglyceryl fatty esters as antifoaming agents in the production of foods, for example tofu. These formulations contain no fatty alcohols; the presence of alkaline earth metal salts is, however, essential. Antifoaming agent formulations are known to be effective only for the range of applications for which they have been developed, for example in the textile industry, food industry, paper industry, surface coating industry and leather industry. Owing to this specific effectiveness, antifoaming agents cannot be successfully transferred to, or used in, other areas.

Since there is an increasing tendency to use closed water circulations in the paper mills, the result is an increase in the temperature of circulated water in papermaking, so that the effectiveness of the antifoaming agents used to date is markedly reduced.

EP-A-0 322 830 discloses antifoaming agents based on oil-in-water emulsions, in which the oil phase of the emulsions contains (a) a $C_{12}$-$C_{26}$-alcohol, distillation residues which are obtainable in the preparation of alcohols having a relatively large number of carbon atoms by the oxo synthesis or by the Ziegler method and which may furthermore be alkoxylated and/or (b) a fatty ester of a $C_{12}$-$C_{22}$-carboxylic acid with a monohydric to trihydric $C_1$-$C_{18}$-alcohol and, if required, (c) a hydrocarbon having a boiling point above 200° C. or a fatty acid of 12 to 22 carbon atoms, accounts for from 5 to 50% by weight of the emulsion and has a mean particle size of <25 μm, and in which from 5 to 50% by weight of components (a) and (b) of the oil phase of the oil-in-water emulsions have been replaced by (d) one or more compounds which melt at above 70° C. and are selected from the group consisting of the fatty alcohols of not less than 28 carbon atoms, the esters of a $C_1$-$C_{22}$-carboxylic acid with an alcohol of not less than 28 carbon atoms, the adducts of $C_2$-$C_4$-alkylene oxides with alcohols of not less than 28 carbon atoms, the polyethylene waxes having a molecular weight of not less than 2,000, the carnauba waxes, the montanic ester waxes and the montanic acid waxes and salts thereof.

The oil-in-water emulsions are effective anti-foams in papermaking.

EP-A-531713 discloses antifoaming agents for the paper industry, based on oil-in-water emulsions, in which the oil phase accounts for from 5 to 50% by weight of the emulsion if the oil phase of the emulsions contains (a) an alcohol of not less than 12 carbon atoms, fatty esters of alcohols of not less than 22 carbon atoms and $C_1$-$C_{36}$-carboxylic acids, distillation residues which are obtainable in the preparation of alcohols having a relatively large number of carbon atoms by the oxo synthesis or by the Ziegler method and which may furthermore be alkoxylated, a mixture of the stated compounds and/or (b) a fatty ester of a $C_{12}$-$C_{22}$-carboxylic acid with a monohydric to trihydric $C_1$-$C_{18}$-alcohol and, if required, (c) a hydrocarbon having a boiling point above 200° C. or a fatty acid of 12 to 22 carbon atoms, in combination with (d) from 1 to 80% by weight of polyglyceryl esters which are obtainable by not less than 20% esterification of a polyglycerol mixture of from 0 to 10% by weight of monoglycerol,
from 15 to 40% by weight of diglycerol,
from 30 to 55% by weight of triglycerol, from 10 to 25% by weight of tetraglycerol,
from 0 to 15% by weight of pentaglycerol,
from 0 to 10% by weight of hexaglycerol and
from 0 to 5% by weight of polyglycerols having
higher degrees of condensation
with one or more fatty acids of 12 to 36 carbon atoms.

The antifoaming agents of EP-A-531713 were found to be at least as effective in the paper industry.

BRIEF SUMMARY OF THE INVENTION

It is an object of the present invention to provide a more effective antifoaming agent for the paper industry.

This object is achieved by the present invention which provides antifoaming agents for the paper industry, based on oil-in-water emulsions, in which the oil phase accounts for from 5 to 50% by weight of the emulsion if the oil phase of the emulsions contains (a) an alcohol of not less than 12 carbon atoms, fatty esters of alcohols of not less than 22 carbon atoms and $C_1$-$C_{36}$-carboxylic acids, distillation residues which are obtainable in the preparation of alcohols having a relatively large number of carbon atoms by the oxo synthesis or by the Ziegler method and which may furthermore be alkoxylated, a mixture of the stated compounds and (b) optionally a fatty ester of a $C_{12}$-$C_{22}$-carboxylic acid with a monohydric to trihydric $C_1$-$C_{18}$-alcohol and, (c) optionally a hydrocarbon having a boiling point above 200° C. or a fatty acid of 12 to 22 carbon atoms, in combination with from 1 to 80% by weight of component (d) comprising (d1) polyglyceryl esters which are obtainable by not less than 20% esterification of a polyglycerol mixture of
from 0 to 10% by weight of monoglycerol,
from 15 to 40% by weight of diglycerol,
from 30 to 55% by weight of triglycerol,
from 10 to 25% by weight of tetraglycerol,
from 0 to 15% by weight of pentaglycerol,
from 0 to 10% by weight of hexaglycerol and
from 0 to 5% by weight of polyglycerols having
higher degrees of condensation
with one or more fatty acids of 12 to 36 carbon atoms;
and (d2) $C_{18}$-$C_{30}$ alkyl behenate.

In general the polyglycerols having higher degrees of condensation may have degrees of condensation of at least seven i.e. at least seven repeating glycerol units. The polyglycerols having higher degree of condensation may have degrees of condensation of at least 10. This may be at least 14 or at least 15 or may be at least 20. The degree of condensation may be as high as 25 or even as high as 30 and can be as high as 40 or 50.

The alkyl moiety of component (d2) may be linear or branched, but preferably is linear. Preferably component (d2) is a C18-C24 alkyl behenate, such as C18-C22 alkyl behenate. More preferably component (d2) is a C22 alkyl behenate, in particular behenyl behenate.

These antifoaming agents are used, in amounts of from 0.02 to 0.5 part by weight per 100 parts by weight of the foam-forming medium, for preventing foam in pulp cooking, the beating of paper stock, papermaking and the dispersing of pigments for papermaking. In the stated amounts, they also act as deaerators in paper stocks.

DETAILED DESCRIPTION OF THE INVENTION

Figure 1:
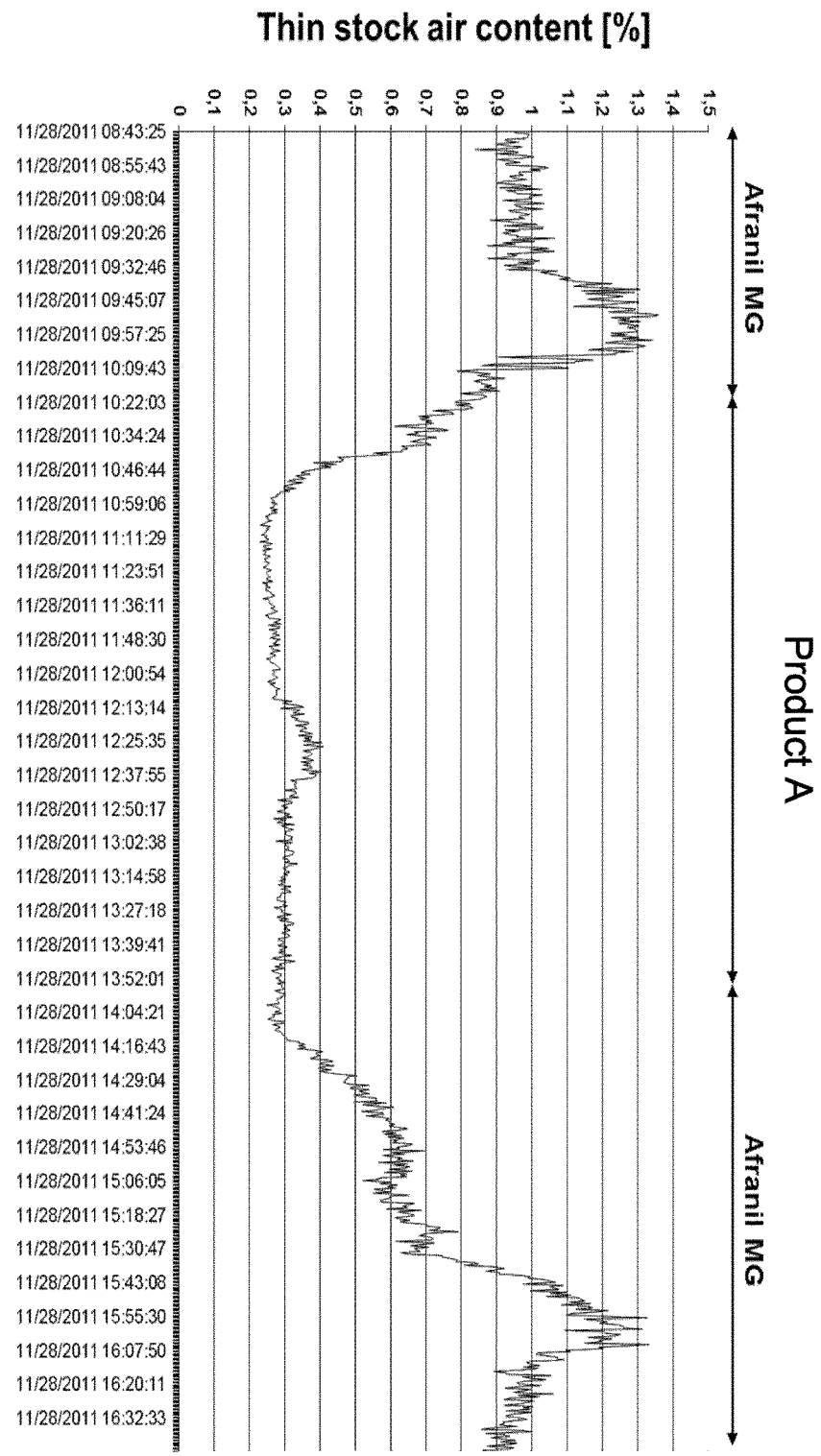
FIG. 1: Air content measurement results from Example 2 comparing Product A (according to the invention) and Afranil MG, a well market established antifoaming agent of BASF.

In particular, alcohols of not less than 12 carbon atoms or mixtures of alcohols are used as component (a) of the oil-in-water emulsions. As a rule, these are monohydric alcohols which contain up to 48 carbon atoms in the molecule. Such products are commercially available. However, fatty alcohols which contain a substantially larger number of carbon atoms in the molecule may also be used as component (a). Components (a) are either natural or synthetic alcohols. For example, lauryl alcohol, myristyl alcohol, cetyl alcohol, palmityl alcohol, stearyl alcohol, behenyl alcohol, oleyl alcohol, ricinoleyl alcohol, linoleyl alcohol and erucyl alcohol are suitable.

Mixtures of alcohols, for example mixtures of (1) alcohols of 12 to 26 carbon atoms and (2) alcohols of 28 to 48 carbon atoms, can also be used as component (a).

The synthetic alcohols, which are obtainable, for example, by the Ziegler method by oxidation of alkylaluminums, are saturated, straight-chain unbranched alcohols. Synthetic alcohols are also obtained by the oxo synthesis. As a rule, alcohol mixtures are obtained here. Distillation residues which are obtained in the preparation of the abovementioned alcohols by the oxo synthesis or by the Ziegler method can also be used as component (a) of the oil phase of the antifoaming agent emulsions. Alkoxylated distillation residues which are obtained in the abovementioned processes for the preparation of higher alcohols by the oxo synthesis or by the Ziegler method are also suitable as component (a) of the oil phase of the antifoaming agent emulsions. The oxyalkylated distillation residues are obtained by subjecting the distillation residues to alkoxylation with ethylene oxide or with propylene oxide or with a mixture of ethylene oxide and propylene oxide by a known method. Up to 5 ethylene oxide or propylene oxide groups undergo addition per OH group of the alcohol in the distillation residue. Preferably, 1 or 2 ethylene oxide groups undergo addition per OH group of the alcohol in the distillation residue.

Other suitable components (a) are fatty esters of alcohols of not less than 22 carbon atoms and $C_1$-$C_{36}$-carboxylic acids, for example montan waxes or carnauba waxes.

The abovementioned compounds of component (a), either alone or as a mixture with one another in any ratios as part of component (a), may form the oil phase of the oil-in-water emulsions.

The optional component (b) of the oil phase of the anti-foaming agent emulsion is any of the compounds which are fatty esters of $C_{12}$-$C_{22}$-carboxylic acids with a monohydric to trihydric $C_1$-$C_{18}$-alcohol. The fatty acids which form the basis of the esters are, for example, lauric acid, myristic acid, palmitic acid, stearic acid, arachic acid and behenic acid. Palmitic acid or stearic acid is preferably used for the preparation of the esters. Monohydric $C_1$-$C_{18}$-alcohols can be used for esterifying the stated carboxylic acids, for example methanol, ethanol, propanol, butanol, hexanol, decanol and stearyl alcohol, as well as dihydric alcohols, such as ethylene glycol, or trihydric alcohols, such as glycerol. The polyhydric alcohols may be completely or partially esterified.

The oil phase of the emulsion may additionally be formed by a further class of water-insoluble compounds which are referred to below as component (c). The compounds of component (c) may account for up to 50% by weight, based on components (a) and if present (b), of the oil phase of the antifoaming agent emulsions. They may be added either to the compounds stated under component (a) or if compounds of component (b) are present a mixture of components (a) and (b). Suitable components (c) are hydrocarbons having a boiling point of more than 200° C. at 1013 mbar and a pour point below 0° C., or fatty acids of 12 to 22 carbon atoms. Preferred hydrocarbons are liquid paraffins, such as the commercial paraffin mixtures, which are also referred to as white oil.

In general the antifoaming agent compositions of the present invention will comprise only components (a) and (d). However, when the compositions also include component (b) components (a) and (b) can be used in any ratio for the preparation of the antifoaming agent emulsions. Each of these two components may be present in the antifoaming agents either alone or as a mixture with the other. For example, mixtures of (a) and (b) which contain from 40 to 60% by weight of component (a) and from 60 to 40% by weight of component (b) may be used. The oil phase of the oil-in-water emulsions may contain one or more compounds (c) either instead of component (b) or in addition to component (c). Preferably the composition of the present invention does not contain either component (b) or component (c). However, it is essential that at least one of the compounds of abovementioned component (a) is in combination with one or more compounds of the following group (d) forms the oil phase of the oil-in-water emulsions. The compounds (d) account for from 1 to 80, preferably from 5 to 20, % by weight of the oil phase of the oil-in-water emulsions. The compounds of component (c) may be used in amounts of up to 40% by weight, based on the oil phase of the oil-in-water emulsions, in the case of all three abovementioned combinations of the composition of the oil phase.

Suitable components (d1) of the oil phase are polyglyceryl esters which are obtainable by not less than 20% esterification of polyglycerol mixtures of
from 0 to 10% by weight of glycerol,
from 15 to 40% by weight of diglycerol,
from 30 to 55% by weight of triglycerol,
from 10 to 25% by weight of tetraglycerol,
from 0 to 15% by weight of pentaglycerol,
from 0 to 10% by weight of hexaglycerol and
from 0 to 10%, preferably 0 to 5%, by weight of polyglycerols having a higher degree of condensation
with one or more fatty acids having 12 to 36 carbon atoms in the molecule. The polyglycerol mixtures described above are preferably esterified with fatty acids of 16 to 30 carbon atoms. The degree of esterification is from 20 to 100%, preferably from 60 to 100%. The fatty acids which are suitable for esterifying the polyglycerol mixtures may be saturated fatty acids as well as unsaturated fatty acids, for example lauric acid, myristic acid, palmitic acid, stearic acid, arachic acid, behenic acid and montanic acid. Ethylenically unsaturated fatty acids, for example oleic acid, hexadecenoic acids, elaidic acid, eicosenoic acids and docosenoic acids, such as erucic acid or brassidic acid, and polyunsaturated acids, such as octadecenedienoic acids and octatrienoic acids, such as linoleic acid and linolenic acid and mixtures of the stated saturated and unsaturated carboxylic acids are also suitable for esterifying the polyglycerol mixtures. Preferably the fatty acid is behenic acid. Preferred polyglyceryl esters are polyglyceryl behenate.

The polyglycerols with a higher degree of condensation may be as defined previously in this specification.

The polyglycerol mixtures are obtainable, for example, by alkaline-catalyzed condensation of glycerol at elevated temperatures (cf. for example Fette, Seifen, Anstrichmittel, 88th year, No. 3, pages 101 to 106 (1986) or DE-A 3 842 692), by reacting glycerol with epichlorohydrin in the presence of an acidic catalyst at elevated temperatures. However, the mixtures are also obtainable by mixing the pure polyglycerol components, for example diglycerol, triglycerol and tetraglycerol, with one another. The polyglycerol mixtures which are not less than 20% esterified are prepared by esterifying the polyglycerol mixtures with the desired fatty acid or mixture of fatty acids by a known method. As a rule, the reaction is carried out in the presence of an acidic esterification catalyst, such as sulfuric acid, p-toluenesulfonic acid, citric acid, phosphorous acid, phosphoric acid or hypophosphorous acid, or of a basic catalyst, such as sodium methylate or potassium tertbutylate.

Component (d2) may be obtained by the esterification of the respective alcohols and behenic acid. Behenic acid is a commercially available carboxylic acid, for instance from BASF.

Any weight ratio of component (d1) and component (d2) may be employed in accordance with the present invention. Suitably the ratio of component (d1) and component (d2) may be 99:1 to 1:99 by weight, for instance 60:40 to 5:95, for instance 40:60 to 5:95, for instance 25:75 to 10:90.

A particularly preferred formulation employs both polyglyceryl behenate as component (d1) and behenyl behenate as component (d2).

The compounds of component (d), i.e. collectively both components (d1) and (d2) are preferably present in an amount of from 0.5 to 20 preferably from 1 to 15, %, more preferably for 5 to 10% by weight in the oil phase. The oil phase may account for from 5 to 50% by weight of the oil-in-water emulsions, while the content of the aqueous phase in the emulsions is from 95 to 50% by weight, the percentages by weight summing to 100.

The oil phase should be emulsified in the aqueous phase. Apparatuses in which the components of the emulsion may be subjected to a strong shear gradient, for example dispersers, are required for this purpose. In order to obtain particularly stable oil-in-water emulsions, the emulsification of the oil phase in the aqueous phase is for instance carried out in the presence of surfactants which have an HLB value of more than 6 (for the definition of the HLB value, see W. C. Griffin, Journal of the Society of Cosmetic Chemists, 5 (1954), 249-246). The surfactants are oil-in-water emulsifiers or typical wetting agents. Among the surfactants, it is possible to use anionic, cationic or nonionic compounds or mixtures of these compounds which are compatible with one another, for example mixtures of anionic and nonionic or of cationic and nonionic wetting agents. Substances of the stated type are, for example, sodium salts or ammonium salts of higher fatty acids, such as ammonium oleate or ammonium stearate, oxyalkylated phenols, such as nonylphenol or isooctylphenol which have been reacted with ethylene oxide in a molar ratio of from 1:2 to 1:50, oxyethylated unsaturated oils, for example the reaction products of one mol of castor oil and from 30 to 40 mol of ethylene oxide or the reaction products of one mol of sperm alcohol with from 60 to 80 mol of ethylene oxide. Sulfated oxyethylation products of nonylphenol or octylphenol are also preferably used as emulsifiers, said products being present as the sodium or ammonium salt of the corresponding sulfuric half-ester. 100 parts by weight of the oil-in-water emulsions usually contain from 0.1 to 5 parts by weight of an emulsifier or of an emulsifier mixture. In addition to the abovementioned emulsifiers, protective colloids, or thickeners such as high molecular weight polysaccharides and soaps, or other conventional additives, such as stabilizers, may also be used in the preparation of the oil-in-water emulsions. For example, the addition of from 0.05 to 1.0% by weight, based on the total emulsion, of high molecular weight, water-soluble homo- and copolymers of acrylic acid, methacrylic acid, acrylamide or methacrylamide as a stabilizer has proven useful. For example, EP-A 0 149 812 relates to the use of such stabilizers. A suitable thickener includes Xanthan gum.

Emulsifying the oil phase in the aqueous phase gives oil-in-water emulsions which have a viscosity of from 300 to 3,000 mPa·s, immediately after preparation, for example from 0 to 30 min of preparation, or from 0 to 15 min of preparation, or 0 to 10 min of preparation for 0 to 5 min of preparation, and a mean particle size of the oil phase of less than 25 μm, preferably from 0.5 to 10 μm, more preferably 3 to 5 μm.

Although the compounds of component (d), i.e. the combination of components (d1) and (d2), alone or as a mixture with component (c), have virtually no activity as oil-in-water emulsion antifoaming agents, combining a compound of component (d) with at least one of the compounds of component (a) surprisingly results in a synergistic effect. The addition of component (d) to the oil phase of antifoaming agents which contain component (a) and, if required, further components in emulsified form has little or no adverse effect on the effectiveness of the resulting antifoaming agents at relatively low temperatures, for example at room temperature, but increases the effectiveness of the antifoaming agents to an unexpected extent in aqueous systems whose temperature is for instance in the range between 30° C. and 50° C. The novel oil-in-water emulsions are used in the paper industry in aqueous systems in which the formation of foam at relatively high temperatures must be prevented, for example in pulp cooking, in the beating of paper stock, in papermaking with closed water circulations in paper machines, and in the dispersing of pigments for papermaking. From 0.02 to 0.5, preferably from 0.05 to 0.3, part by weight of the oil-in-water antifoaming agent emulsion is used per 100 parts by weight of paper stock in a foam-forming medium. When added to a paper stock suspension, the antifoaming agents furthermore result in deaeration and are therefore also used as deaerators in papermaking (added to the paper stock). They are also suitable as antifoaming agents in paper coating, where they are added to paper coating slips. The antifoaming agents can also be used in the food industry, in the starch industry and in wastewater treatment plants for preventing foam. If they are added to the paper stock as a deaerator, the amounts used for this purpose are from 0.02 to 0.5 part by weight per 100 parts by weight of paper stock.

EXAMPLES

Product A, according to the invention, was prepared as follows:

Preparation of Water Phase:

A beaker is filled with 713.8 g deionized water. While stirring 2.5 g Xanthan TG powder (available from Jungbunzlauer, Germany) is added carefully to avoid lump formation. Than 6.8 g Emulan TO4070 (available from BASF) is added. The blend is heated up to 95° C. and kept for 15 min at that temperature.

Preparation of Oil Phase:

In a beaker the following components are blended:
202 g Nafol™ 20+BA (Fatty alcohol blend (C18-C24)) available from Sasol□
3.4 g Polyglyceryl behenate (comprising 27% by weight diglyceryl behenate, 44% by weight triglyceryl behenate, 19% by weight tetraglyceryl behenate, and 10% by weight behenate esters of polyglycerols with higher degrees of condensation (i.e. at least 5 condensed glycerol units)) (available from BASF),
2.5 g Behenyl behenate (Stéarinerie Dubois, France)
45 g Paraffin 52/54 (available from H&R Wax Company or Sasol Wax GmbH, Germany)

The blend is heated up to 98° C. and gently stirred as melt.

Homogenization Step:

Both blends are mixed and emulsified with an Ultra Turrax T 50 (IKA) until the chosen particle size is reached. Particle size measured using Beckmann Coulter particle size detector model LS 13320. After cooling the blend down to room temperature the dispersion is microbiologically stabilized with 4 g Acticide MBS (Thor Chemie)

Example 1

In a trial at a testliner mill antifoaming agent Product A (according to the invention) (29% solids) was tested in a short term trial against competitive antifoaming agent Nalco 74192 (28% solids). The mill used recycled paper (old corrugated cardboard) as raw materials. Wet end temperature was 31° C. Both antifoaming agents were dosed into white water directly in the white water tray (front side).

During the trial the air content in the head box (HB) and in the white water (WW) (after the wire section) were monitored against antifoaming agent dosage over time. The air content was measured with EGT-Tester (GB Machining Inc, 4415 102nd Ave E, Edgewood, Wash. 98371, USA).

Results are presented in the table below:

| Time [min] | Air content HB [%] | Air content WW [%] | Antifoaming agent dosage [l/h] | Product in use |
| --- | --- | --- | --- | --- |
| 0 | 3.2 | 0.7 | 4.3 | Nalco 74192 |
| 60 | 3.2 | 0.7 | 4.3 | Nalco 74192 |
| 130 | 1.74 | 0.4 | 5 | Product A |
| 170 | 1.31 | 0.34 | 5 | Product A |
| 210 | 1.25 | 0.34 | 5 | Product A |

To avoid initial process complications starting up the process, the dosage of each new antifoaming agent product is often increased just at the initial stage. In this case the new antifoaming agent Product A was increased for 16.3% compared to the Nalco 74192 in use prior to the change.

As result it was observed, that the air content measured online by the mill dropped down to 48.6% in white water and 39.1% in headbox compared to its original level applying Nalco 74192.

Example 2

In a mill trial at a newsprint mill, Product A (29% solids) was tested in a trial against Afranil MG (29% solids), a well market established antifoaming agent of BASF. The mill used broke, ground wood and predominantly deinked pulp as raw materials. Wet end temperature was 44° C. Both antifoaming agents were dosed into recycled white water directly in the white water tray (front side).

Afranil MG was dosed as standard product in this mill. At trial start the Afranil MG dosage was stopped. Simultaneously the Product A dosage started with exactly same dosage volumes and at the same dosage place. The air content was measured online with SONARtrac VF/GVF-100 (CiDRA, 50 Barnes Park North, Wallingford, Conn. 06492, USA).

The results are displayed in FIG. 1.

As result it was observed, that the air content dropped significantly from around 1% down to around 0.3% in thin stock. Switching back from Product A to Afranil MG (on constant dosage level) the air content increased slowly to its former air content level.

Example 3

During a longer trial with Product A (29% solids) in a newsprint mill, the deaerator dosage was switched to Afranil MG (29% solids) and back to compare the efficiency of both products. The mill used broke, ground wood and predominantly deinked pulp as raw materials. Wet end temperature was 43° C. Both antifoaming agents were dosed into white water directly in the white water tray (front side).

Product A was dosed continuously. At trial start the antifoaming agent was switched from Product A to the Afranil MG and later back to Product A. Employing 0.122 l/min Product A, the thin stock air content was surprisingly maintained at a low level. With the same dosage amount of Afranil MG the thin stock air content increased significantly. In order to achieve the deaeration level of 1.22 l/min Product A the dosage volume of Afranil MG had to be increased to 0.177 l/min. Thus the dosage rate of Afranil MG needed to increased up to 45% to match the same air content in thin stock.

The air content was measured online with SONARtrac VF/GVF-100 (CiDRA, 50 Barnes Park North, Wallingford, Conn. 06492, USA).

Figure 2:
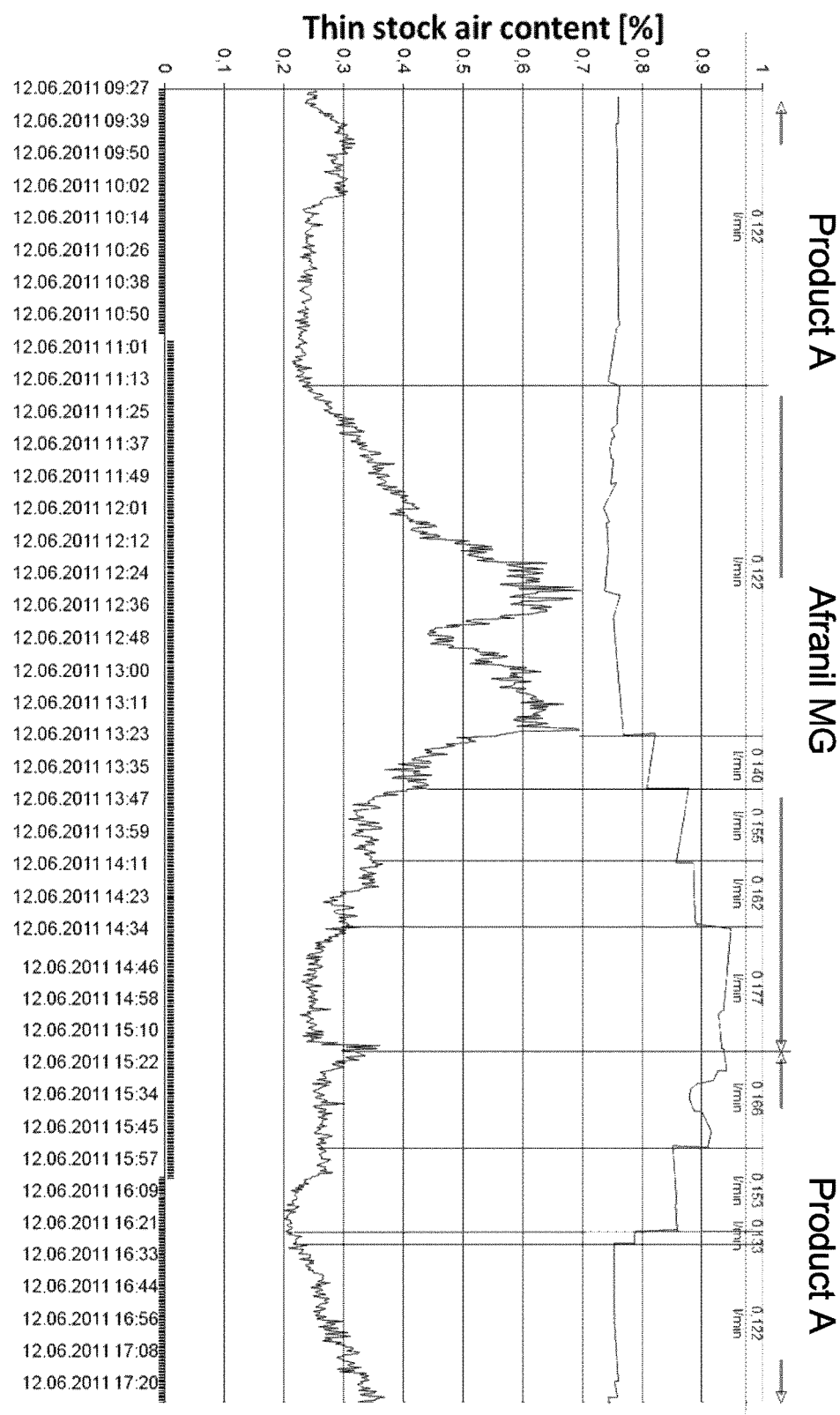
FIG. 2: Air content measurement results from Example 3 comparing Product A (according to the invention) and Afranil MG, a well market established antifoaming agent of BASF.

The results are displayed in FIG. 2.

The invention claimed is:

1. An antifoaming agent, comprising an oil-in-water emulsion in which the oil phase accounts for from 5 to 50% by weight of the emulsion, wherein the oil phase comprises:
   (a) at least one selected from the group consisting of
      (a1) an alcohol of not less than 12 carbon atoms, and
      (a2) a $C_1$-$C_{36}$-carboxylic acid, a distillation residue from preparing an alcohol by oxo synthesis or by a Ziegler method, wherein the distillation residue is optionally alkoxylated;
   (b) optionally, a fatty ester of a $C_{12}$-$C_{20}$-carboxylic acid with a monohydric to trihydric $C_1$-$C_{18}$-alcohol;
   (c) optionally, a hydrocarbon having a boiling point above 200° C. or a fatty acid of 12 to 22 carbon atoms; and
   (d) a component comprising:
      (d1) a polyglyceryl ester, which is polyglyceryl behenate obtained by esterifying, to an esterification degree of at least 20%, behenic acid with a polyglycerol mixture comprising:
         from 0 to 10% by weight of monoglycerol,
         from 15 to 40% by weight of diglycerol,
         from 30 to 55% by weight of triglycerol,
         from 10 to 25% by weight of tetraglycerol,
         from 0 to 15% by weight of pentaglycerol,
         from 0 to 10% by weight of hexaglycerol, and
         from 0 to 5% by weight of polyglycerols having higher degrees of condensation; and
      (d2) behenyl behenate,
   wherein the component (d) accounts for 1-80% by weight of the oil phase of the emulsion.

2. A process, for preventing foam in pulp cooking, pulp preparation in the refining of paper stock, in papermaking and in the dispersing of pigments for papermaking, the process comprising:
   adding an effective amount of the antifoaming agent of claim 1 to paper pulp.

3. A process for preventing foam in paper stocks, the process comprising:
   adding the antifoaming agent of claim 1 to paper stock in an amount of from 0.02 to 0.5 parts by weight per 100 parts by weight of paper stock.

* * * * *

UNITED STATES PATENT AND TRADEMARK OFFICE
CERTIFICATE OF CORRECTION

| | |
|---|---|
| PATENT NO. | : 9,982,392 B2 |
| APPLICATION NO. | : 15/035959 |
| DATED | : May 29, 2018 |
| INVENTOR(S) | : Holger Kern et al. |

It is certified that error appears in the above-identified patent and that said Letters Patent is hereby corrected as shown below:

On the Title Page

Item (56), OTHER PUBLICATIONS, Line 6, "2012-P87954, WO" should read --2012-P87954, Class E19, WO--.

In the Specification

Column 6, Line 4, "octadecenedienoic" should read --octadecenedioic--.

Signed and Sealed this
Twenty-first Day of April, 2020

Andrei Iancu
*Director of the United States Patent and Trademark Office*